US012025171B2

(12) United States Patent
Zhang

(10) Patent No.: US 12,025,171 B2
(45) Date of Patent: Jul. 2, 2024

(54) TAMPER-PROOF SCREW

(71) Applicants: Maintek Computer (Suzhou) Co., Ltd, JiangSu (CN); PEGATRON CORPORATION, Taipei (TW)

(72) Inventor: Chang-Lin Zhang, JiangSu (CN)

(73) Assignees: MAINTEK COMPUTER (SUZHOU) CO., LTD, Jiangsu (CN); PEGATRON CORPORATION, Taipei (TW)

( * ) Notice: Subject to any disclaimer, the term of this patent is extended or adjusted under 35 U.S.C. 154(b) by 360 days.

(21) Appl. No.: 17/510,431

(22) Filed: Oct. 26, 2021

(65) Prior Publication Data
US 2022/0154757 A1 May 19, 2022

(30) Foreign Application Priority Data

Nov. 13, 2020 (CN) .......................... 202011269816.6

(51) Int. Cl.
F16B 39/02 (2006.01)
F16B 21/12 (2006.01)
F16B 21/16 (2006.01)
F16B 35/00 (2006.01)
F16B 35/04 (2006.01)
F16B 35/06 (2006.01)
F16B 41/00 (2006.01)

(52) U.S. Cl.
CPC .......... F16B 39/028 (2013.01); F16B 35/041 (2013.01); F16B 35/06 (2013.01)

(58) Field of Classification Search
CPC .... F16B 13/0808; F16B 21/165; F16B 35/06; F16B 35/041; F16B 39/023; F16B 39/028; F16B 41/005

USPC ........................... 411/21, 271, 286, 340, 344
See application file for complete search history.

(56) References Cited

U.S. PATENT DOCUMENTS 2,772,560 A * 12/1956 Neptune .................. E04C 5/167
  52/685
3,390,712 A *  7/1968 McKay .................... F16B 39/04
  411/21
3,552,258 A *  1/1971 Warner ............... F16B 13/0891
  411/21
2011/0311330 A1  12/2011 Wu et al.

FOREIGN PATENT DOCUMENTS

CN       207268245 U     4/2018
CN       109899364 A     6/2019

* cited by examiner

Primary Examiner — William D Hutton, Jr.
Assistant Examiner — Carl J Carlson
(74) Attorney, Agent, or Firm — McClure, Qualey & Rodack, LLP

(57) ABSTRACT

A tamper-proof screw includes a main body, a pin body, a ball, and at least one abutting member. A through hole is provided in the main body. The pin body is movably disposed in the through hole. The ball is located in the through hole. The abutting member is located in the through hole and has a connecting end and a free end opposite to each other. The connecting end is disposed on an inner wall of the main body and located between the ball and the free end. The ball is located between the pin body and the abutting member. When the pin body moves in the through hole to push the ball to press against the connecting end of the abutting member, the abutting member pivots around the connecting end to allow the free end to extend outwards from the main body.

8 Claims, 5 Drawing Sheets

TAMPER-PROOF SCREW

RELATED APPLICATION

This application claims priority to China Application Serial Number 202011269816.6, filed Nov. 13, 2020, which is herein incorporated by reference in its entirety.

BACKGROUND

Field of Invention

The present disclosure relates to a screw and, more particularly, to a tamper-proof screw.

Description of Related Art

Electronic products or products with safety requirements usually use tamper-proof screws to prevent the products from being randomly disassembled by a user. For example, the tamper-proof screw may be used in an anti-theft device to protect internal wiring from being randomly adjusted by a user. In addition, the tamper-proof screw may also be used in an electronic product to prevent core parts of the product from being randomly disassembled by a user.

However, generally used tamper-proof screws can still be disassembled with special tools, thus adding concerns and troubles to product manufacturers.

SUMMARY

An aspect of the present disclosure is a tamper-proof screw to improve the prior art.

A tamper-proof screw according to the present disclosure includes a main body, a pin body, a ball, and at least one abutting member. A through hole is provided in the main body. The pin body is movably disposed in the through hole. The ball is located in the through hole. The abutting member is located in the through hole and has a connecting end and a free end opposite to each other. The connecting end is disposed on an inner wall of the main body and located between the ball and the free end. The ball is located between the pin body and the abutting member. When the pin body moves in the through hole to push the ball to press against the connecting end of the abutting member, the abutting member pivots around the connecting end to allow the free end to extend outwards from the main body.

In one embodiment of the present disclosure, an outer wall of the main body may have threads, and a top portion of the main body may have a first groove for receiving a screwdriver.

In one embodiment of the present disclosure, a top portion of the pin body may have a second groove for receiving a screwdriver.

In one embodiment of the present disclosure, the number of the abutting members may be two, and the two abutting members may be symmetrically disposed along a longitudinal axis of the main body.

In one embodiment of the present disclosure, a distance between the two connecting ends of the two abutting members may be less than a diameter of the ball.

In one embodiment of the present disclosure, the abutting member may be tapered from the connecting end to the free end.

In one embodiment of the present disclosure, the inner wall of the main body around the through hole may have threads coupled with threads of the pin body.

In one embodiment of the present disclosure, the main body may have a slot, and the abutting member may be located in the slot.

In one embodiment of the present disclosure, when the pin body pushes the ball to press against the connecting end of the abutting member, the free end of the abutting member may extend outwards from the slot of the main body.

In the present disclosure, the pin body, the ball, and the abutting member are provided inside the tamper-proof screw, and the abutting member has the connecting end and the free end opposite to each other. Accordingly, when the pin body moves in the through hole to push the ball to press against the connecting end of the abutting member, the abutting member may pivot around the connecting end to allow the free end of the abutting member to extend outwards from the main body, thereby abutting against a locked object outside the screw to ensure that the tamper-proof screw may not be removed. Therefore, the tamper-proof screw in the present disclosure may not be disassembled unless the locked object (such as a product) is destroyed.

DETAILED DESCRIPTION

Figure 1:
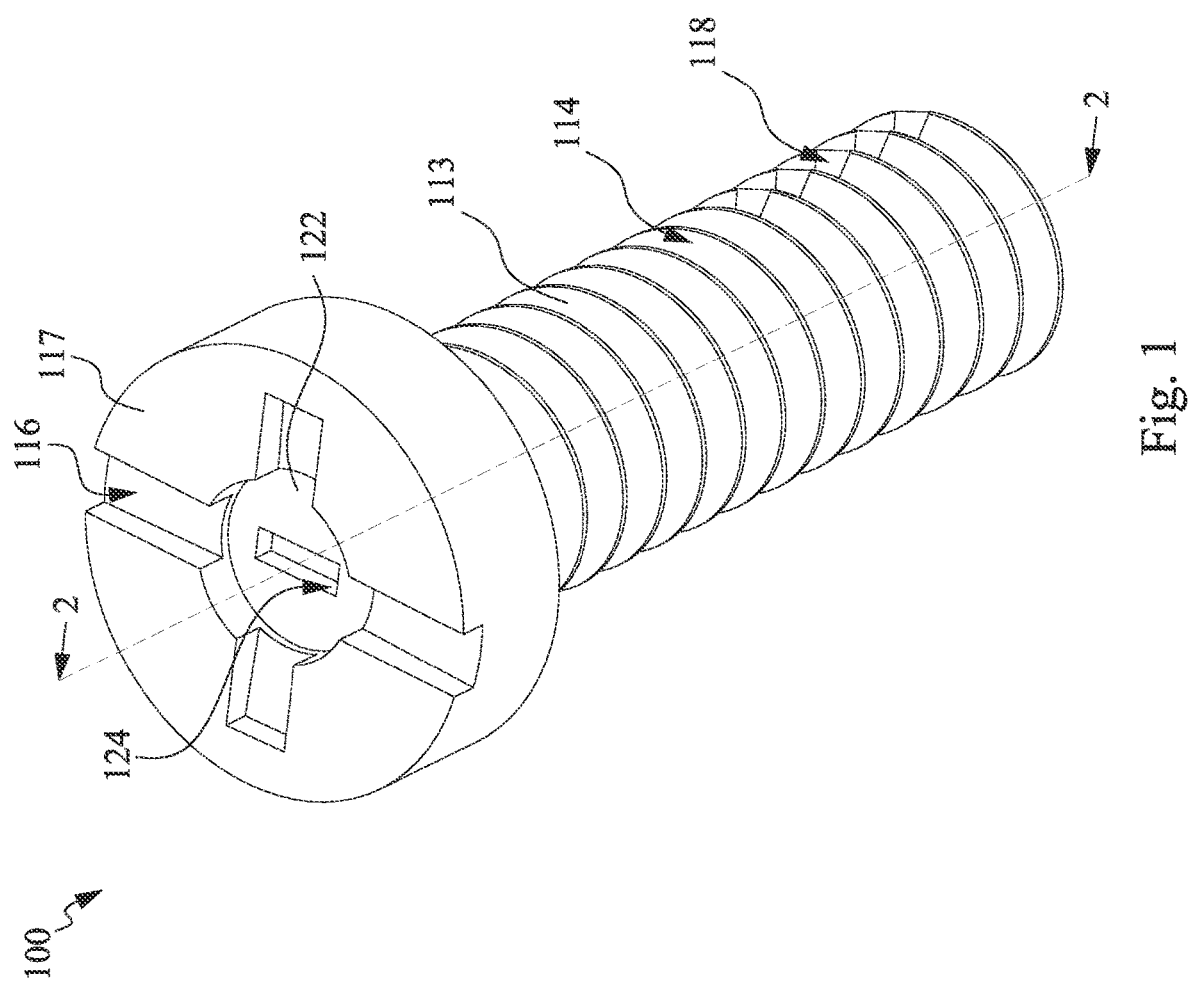
FIG. 1 is a three-dimensional view of a tamper-proof screw according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
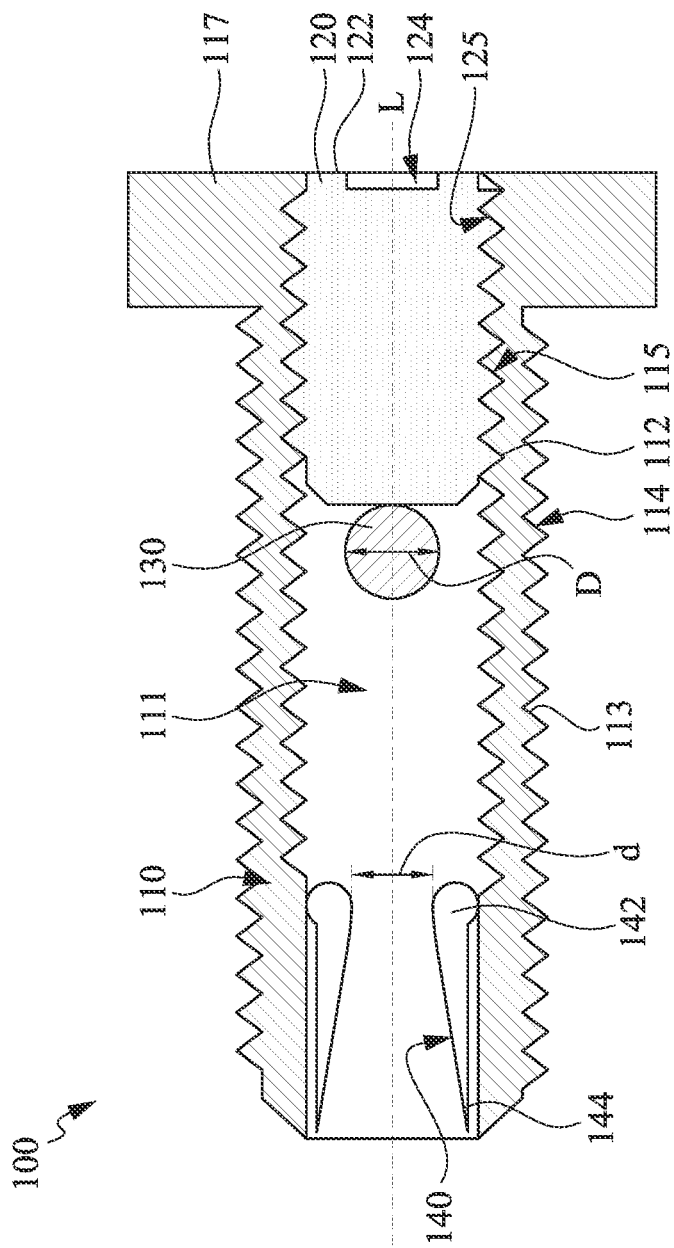
FIG. 2 is a cross-sectional view of the tamper-proof screw along a line 2-2 in FIG. 1.

FIG. 1 is a three-dimensional view of a tamper-proof screw 100 according to an embodiment of the present disclosure. FIG. 2 is a cross-sectional view of the tamper-proof screw 100 along a line 2-2 in FIG. 1. Please refer to FIG. 1 and FIG. 2. In one embodiment of the present disclosure, the tamper-proof screw 100 includes a main body 110, a pin body 120, a ball 130, and at least one abutting member 140. A through hole 111 is provided in the main body 110. The pin body 120 is movably disposed in the through hole 111. The ball 130 is located in the through hole 111. The abutting member 140 is located in the through hole 111 and has a connecting end 142 and a free end 144 opposite to each other. The connecting end 142 of the abutting member 140 is disposed on an inner wall 112 of the main body 110 and is located between the ball 130 and the free end 144. The ball 130 is located between the pin body 120 and the abutting member 140. When the pin body 120 moves in the through hole 111 under force to push the ball 130 to press against the connecting end 142 of the abutting member 140, the abutting member 140 may pivot around the connecting end 142 to allow the free end 144 to extend outwards from the main body 110 (details will be described in FIG. 4).

In one embodiment of the present disclosure, an end of the pin body 120 is configured to contact the ball 130. In this way, when the pin body 120 moves towards the abutting member 140, the ball 130 may be driven to move towards the abutting member 140 at the same time to allow the ball 130 to press against the connecting end 142 of the abutting member 140. The main body 110 and the pin body 120 may be made of a material that includes carbon, iron, chromium, or a combination thereof, but it is not limited in this regard. The ball 130 and the abutting member 140 may be made of a material that includes carbon, iron, chromium, tungsten carbide or a combination thereof, but it is not limited in this regard.

The tamper-proof screw 100 has the pin body 120, the ball 130, and the abutting member 140, and the abutting member 140 has the connecting end 142 and the free end 144 opposite to each other. Accordingly, when the pin body 120 pushes the ball 130 to press against the connecting end 142 of the abutting member 140, the abutting member 140 may pivot around the connecting end 142 to allow the free end 144 of the abutting member 140 to extend outwards from the main body 110, thereby abutting against internal threads of a screw hole of a locked object located outside the main body 110. Accordingly, the tamper-proof screw 100 may not be easily removed after being locked into the locked object (such as a product).

In one embodiment of the present disclosure, two abutting members 140 are provided, and the two abutting members 140 are symmetrically disposed along a longitudinal axis L of the main body 110. Moreover, the two connecting ends 142 of the two abutting members 140 are closer to the ball 130 than the free end 144.

In one embodiment of the present disclosure, the inner wall 112 of the main body 110 around the through hole 111 has threads 115 coupled with threads 125 of the pin body 120. For example, the inner wall 112 of the main body 110 and the pin body 120 have threads 115 and 125 coupled with each other, and therefore the pin body 120 may move in the through hole 111 via the threads 115 and 125. In this way, when the pin body 120 moves in the through hole 111 via the threads 115 and 125, the pin body 120 may push the ball 130 to allow the ball 130 to move in the through hole 111.

In one embodiment of the present disclosure, an outer wall 113 of the main body 110 has threads 114, and a top portion 117 of the main body 110 has a first groove 116 for receiving a screwdriver. For example, the first groove 116 at the top portion 117 of the main body 110 in FIG. 1 may be used for receiving a crosshead screwdriver, but it is not limited in this regard. The first groove 116 is located at the top portion 117 of the main body 110, and extends outwards from the edge of the through hole 111. In this way, the crosshead screwdriver may be engaged into the first groove 116 to rotate the main body 110 thus to lock the tamper-proof screw 100 into the locked object (such as the product) via the threads 114 of the outer wall 113 of the main body 110.

In one embodiment of the present disclosure, a top portion 122 of the pin body 120 has a second groove 124 for receiving a screwdriver. For example, in FIG. 1 the second groove 124 at the top portion 122 of the pin body 120 is a linear groove, but it is not limited in this regard. The second groove 124 may be located at the center of the top portion 122 of the pin body 120. Moreover, a horizontal plane of the top portion 122 of the pin body 120 may be lower than that of the top portion 117 of the main body 110. In addition, when the first groove 116 at the top portion 117 of the main body 110 is rotated by a screwdriver, the pin body 120 in the through hole 111 may be prevented from being rotated at the same time. That is, the first groove 116 at the top portion 117 of the main body 110 and the second groove 124 at the top portion 122 of the pin body 120 may respectively provide functions of rotating the main body 110 and the pin body 120, thereby reducing interference between the main body 110 and the pin body 120 in the through hole 111. In this way, after the tamper-proof screw 100 is locked into the locked object (such as the product), a next operation may be performed.

Figure 3:
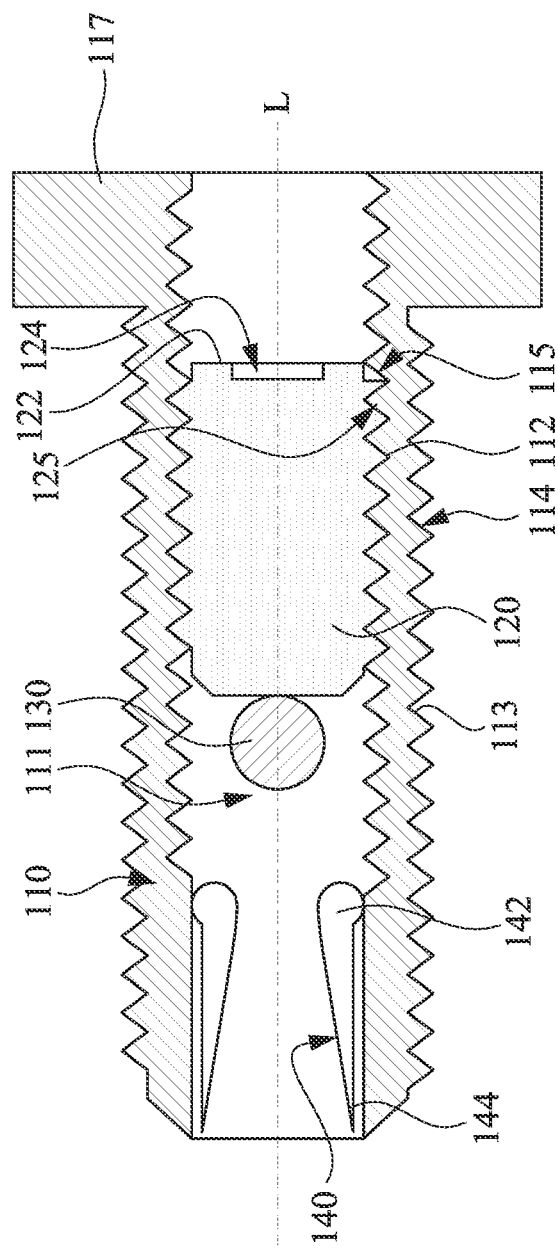
FIG. 3 is a cross-sectional view of the tamper-proof screw in FIG. 2 when a pin body and a ball move in a main body.
Figure 4:
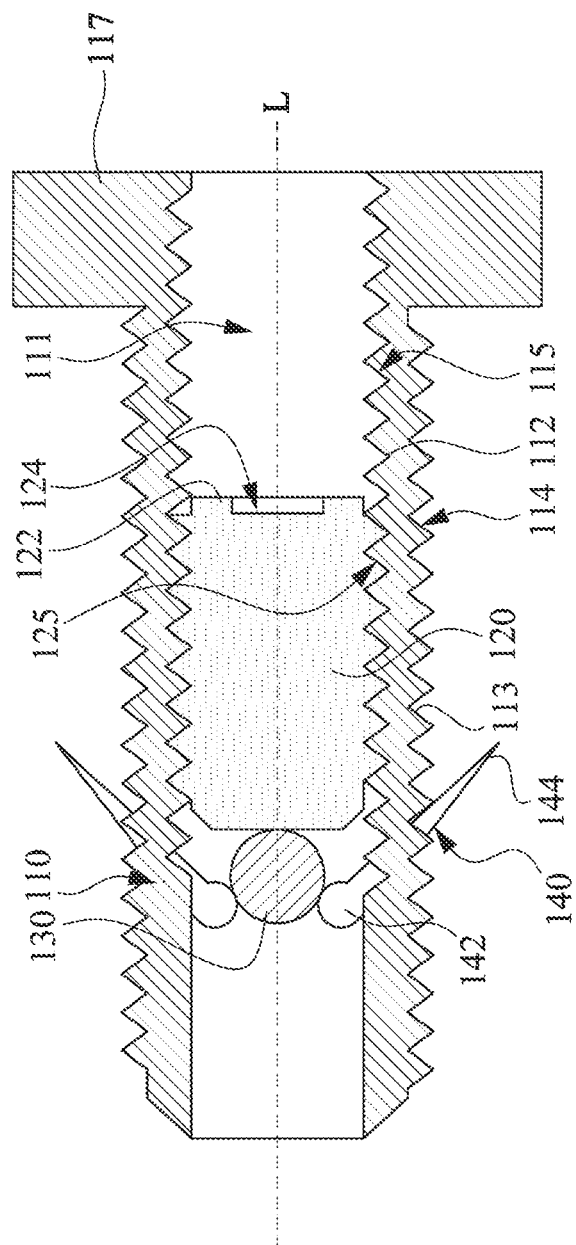
FIG. 4 is a cross-sectional view of the tamper-proof screw in FIG. 2 when an abutting member pivots.

FIG. 3 is a cross-sectional view of the tamper-proof screw in FIG. 2 when the pin body 120 and the ball 130 move in the main body 110. FIG. 4 is a cross-sectional view of the tamper-proof screw in FIG. 2 when the abutting member 140 pivots. Please refer to FIG. 3 and FIG. 4. After the tamper-proof screw 100 is locked into the locked object (such as the product), the second groove 124 at the top portion 122 of the pin body 120 may be rotated by a screwdriver to allow the pin body 120 to move towards the abutting member 140 further to push the ball 130 to move towards the abutting member 140. In this way, the ball 130 may force the abutting member 140 to pivot around the connecting end 142 by the push of the pin body 120 such that the free end 144 of the abutting member 140 extends outwards from the main body 110.

In addition, the outer wall 113 of the main body 110 has the threads 114, and therefore, when the free end 144 of the abutting member 140 extends outwards from the main body 110, the free end 144 of the abutting member 140 may abut against internal threads (not shown) of a screw hole of the locked object outside the main body 110 to ensure that the tamper-proof screw 100 may not be easily removed.

In one embodiment of the present disclosure, a distance d between the two connecting ends 142 of the two abutting members 140 is smaller than a diameter D of the ball 130, so that the ball 130 may not pass between the two abutting members 140 thus to prevent the ball 130 from being unable to effectively exert force on the abutting members 140. Accordingly, when the pin body 120 pushes the ball 130 to press against the abutting members 140, the ball 130 may effectively force the abutting members 140 to pivot around the connecting end 142 to allow the free end 144 of the abutting members 140 to extend outwards from the main body 110.

Moreover, when the free end 144 of the abutting members 140 extends outwards from the main body 110 and is to leave the pin body 120, the ball 130 may still be kept in the through hole 111 of the main body 110. For example, the ball 130 may be caught between the two connecting ends 142 of the two abutting members 140.

In one embodiment of the present disclosure, the abutting member 140 is tapered from the connecting end 142 to the free end 144, and therefore the free end 144 is a thinner end.

Accordingly, when the abutting member 140 pivots, it may be less susceptible to be interfered.

Figure 5:
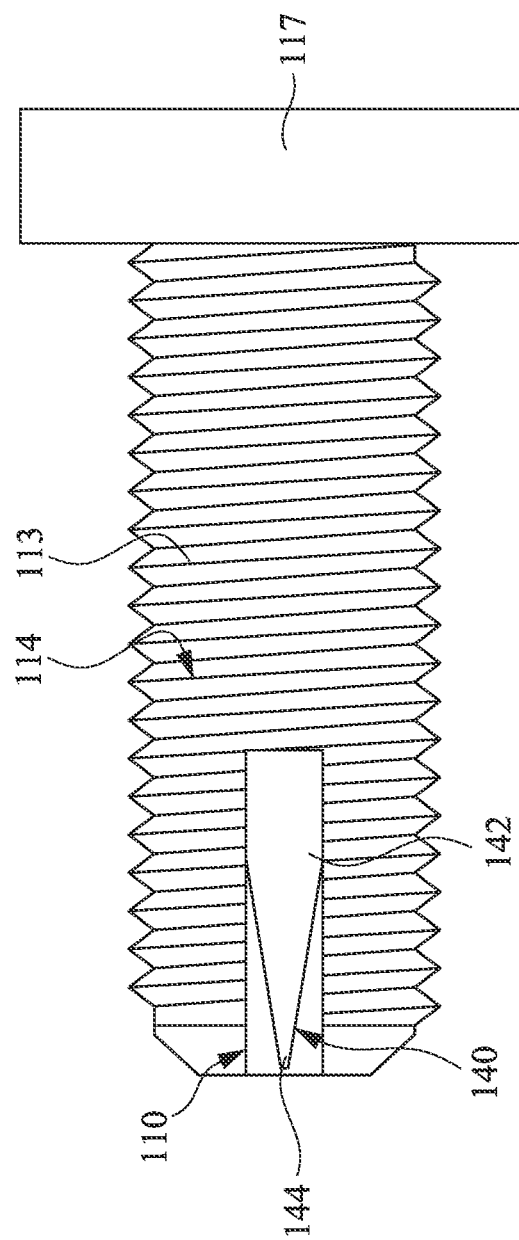
FIG. 5 is a side view of the tamper-proof screw in FIG. 2.

FIG. 5 is a side view of the tamper-proof screw 100 in FIG. 2. Please refer to FIG. 4 and FIG. 5, the main body 110 has a slot 118 (see FIG. 1), and the abutting member 140 is located in the slot 118. When the pin body 120 pushes the ball 130 to press against the connecting end 142 of the abutting member 140, the free end 144 of the abutting member 140 extends outwards from the slot 118 of the main body 110. That is, the slot 118 may be configured for the abutting member 140 to extend outwards from the main body 110.

Moreover, the free end 144 of the abutting member 140 is a thinner end, and therefore the slot 118 is enough to allow the abutting member 140 to pass through without interference during pivoting, and the slot 118 does not need to be quite large. Accordingly, structural strength of the main body 110 may be improved.

In summary, the pin body, the ball and the abutting member are provided inside the tamper-proof screw, and the abutting member has the connecting end and the free end opposite to each other. Accordingly, when the pin body moves in the through hole to push the ball to press against the connecting end of the abutting member, the abutting member may pivot around the connecting end to allow the free end of the abutting member to extend outwards from the main body, thereby abutting against the locked object outside the tamper-proof screw to ensure that the tamper-proof screw may not be removed. Accordingly, the tamper-proof screw may not be disassembled unless the locked object (such as the product) is destroyed.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A tamper-proof screw, comprising:
   a main body, wherein a through hole is provided in the main body;
   a pin body movably disposed in the through hole, a top portion of the pin body having a first groove for receiving a screwdriver;
   a ball located in the through hole; and
   at least one abutting member located in the through hole and having a connecting end and a free end opposite to each other, wherein the connecting end is disposed on an inner wall of the main body and located between the ball and the free end, the ball is located between the pin body and the abutting member, and when the pin body moves in the through hole to push the ball to press against the connecting end of the abutting member, the abutting member pivots around the connecting end to allow the free end to extend outwards from the main body.

2. The tamper-proof screw of claim 1, wherein an outer wall of the main body has threads, and a top portion of the main body has a second groove for receiving a screwdriver.

3. The tamper-proof screw of claim 1, wherein a number of the abutting member is two, and the two abutting members are symmetrically disposed along a longitudinal axis of the main body.

4. The tamper-proof screw of claim 3, wherein a distance between the two connecting ends of the two abutting members is less than a diameter of the ball.

5. The tamper-proof screw of claim 1, wherein the abutting member is tapered from the connecting end to the free end.

6. The tamper-proof screw of claim 1, wherein the inner wall of the main body around the through hole has threads coupled with threads of the pin body.

7. The tamper-proof screw of claim 1, wherein the main body has a slot, and the abutting member is located in the slot.

8. The tamper-proof screw of claim 7, wherein when the pin body pushes the ball to press against the connecting end of the abutting member, the free end of the abutting member extends outwards from the slot of the main body.

* * * * *